United States Patent
Schmidt et al.

(10) Patent No.: US 7,662,469 B2
(45) Date of Patent: Feb. 16, 2010

(54) COMPOSITE ELEMENTS MADE FROM RIGID POLYURETHANE FOAM

(75) Inventors: Marco Schmidt, Speyer (DE); Volker Schmidt, Lemfoerde (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 337 days.

(21) Appl. No.: 11/573,356

(22) PCT Filed: Aug. 4, 2005

(86) PCT No.: PCT/EP2005/008442

§ 371 (c)(1),
(2), (4) Date: Feb. 7, 2007

(87) PCT Pub. No.: WO2006/021306

PCT Pub. Date: Mar. 2, 2006

(65) Prior Publication Data

US 2008/0014411 A1 Jan. 17, 2008

(30) Foreign Application Priority Data

Aug. 25, 2004 (DE) .................. 10 2004 041 298

(51) Int. Cl.
*B32B 27/12* (2006.01)
*C09J 5/06* (2006.01)

(52) U.S. Cl. .............. 428/319.3; 428/319.7; 428/319.9; 428/319.1; 52/309.4; 156/324; 156/331.4

(58) Field of Classification Search ............. 428/319.1, 428/319.3, 319.7, 319.9; 52/309.4; 156/324, 156/331.4
See application file for complete search history.

(56) References Cited

U.S. PATENT DOCUMENTS

| 3,062,699 A | * | 11/1962 | Raphael et al. ............. 162/135 |
| 3,510,391 A | * | 5/1970 | Tarbell et al. ............ 428/317.5 |
| 4,572,862 A | * | 2/1986 | Ellis ........................... 442/136 |
| 6,044,604 A | * | 4/2000 | Clayton et al. ............. 52/309.9 |
| 6,200,681 B1 | | 3/2001 | Jahns et al. |
| 7,166,355 B2 | * | 1/2007 | Jahns et al. ............ 428/402.21 |
| 2003/0118822 A1 | | 6/2003 | Jahns et al. |
| 2003/0211796 A1 | | 11/2003 | Jahns et al. |
| 2004/0234738 A1 | | 11/2004 | Jahns et al. |

FOREIGN PATENT DOCUMENTS

| DE | 101 39 171 A1 | 2/2003 |
| EP | 1 321 182 A1 | 6/2003 |
| EP | 1 362 900 A2 | 11/2003 |
| WO | WO 99/24525 | 5/1999 |
| WO | WO 03/016650 A1 | 2/2003 |

* cited by examiner

*Primary Examiner*—Hai Vo
(74) *Attorney, Agent, or Firm*—Oblon, Spivak, McClelland, Maier & Neustadt, L.L.P.

(57) ABSTRACT

The present invention relates to a composite element composed of rigid polyurethane foam and of two outer layers, wherein at least one outer layer is a molding modified with microcapsules, and the microcapsules comprise a polymer as capsule wall and a capsule core composed mainly of latent-heat-accumulator material.

10 Claims, No Drawings

COMPOSITE ELEMENTS MADE FROM RIGID POLYURETHANE FOAM

The present application relates to composite elements composed of rigid polyurethane foam and of two outer layers.

Composite elements composed of rigid polyurethane foam, known as sandwich elements, are used not only as structural elements in domestic construction but also in industrial constructions for facades and roofs of industrial buildings, and as structural elements in cold-store construction, in sectional doors, in portable office accommodation, or in residential trailer construction, where their wide use is based on their very good insulating properties. They can be used to produce energy-optimized structures. However, their low density means that their buildings have little capability for buffering with respect to temperature peaks and are subject to very rapid heating or cooling, giving unsatisfactory internal atmospheric conditions.

In summer, the mass of a structure accumulates inflowing heat during the day and in the ideal case thus keeps the internal temperature constant. The accumulated heat is then released back into the external atmosphere under cooler nighttime conditions. The thermal mass of the building is therefore indispensable if pleasant internal temperature and humidity are to be achieved even in summer without powered air-conditioning. However, buildings composed of sandwich elements lack any such large thermal mass.

Latent-heat accumulators have been studied in recent years as a new form of combined building material. Their mode of action is based on the enthalpy generated during the solid/liquid phase transition, involving absorption or release of energy to the environment at constant temperature. They may therefore be used for maintaining a constant temperature within a specified temperature range. Since, depending on the temperature, the latent-heat-accumulator materials may also be liquid, they cannot be used directly with construction materials for fear of emissions into the internal atmosphere or of separation from the construction material.

DE-A-101 39 171 describes the use of microencapsulated latent-heat-accumulator materials in gypsum plasterboard.

The earlier U.S. application Ser. No. 60/573,420 teaches the use of microencapsulated latent-heat-accumulator materials in particle board.

It is an object of the present invention to improve composite elements composed of rigid polyurethane foam in such a way that the buildings produced from them have better atmospheric conditions.

This object is achieved via a composite element composed of rigid polyurethane foam and of two outer layers, wherein at least one outer layer is a molding modified with microcapsules, and the microcapsules comprise a polymer as capsule wall and a capsule core composed mainly of latent-heat-accumulator material.

The outer layer used may be of any desired sheet-like material with adequate strength. Preferred outer layers are panels composed, for example, of gypsum-plaster, plastics-, or lignocellulose-containing materials, and which are suitable for binding an adequate amount of latent-heat-accumulator material within their volume. Preference is given to composite elements in which at least one outer layer is a modified molding composed of lignocellulose-containing material or is a modified molding based on gypsum plaster. Moldings of this type are described in DE-A-101 39 171, DE-A-101 43 612, and the earlier U.S. application Ser. No. 60/573,420.

The unmodified outer layer, also termed outward-facing outer layer, generally external to the building, may be composed of the usual, generally weather-resistant, materials used for these composite elements. The outer layer is preferably a metal foil and/or metal sheet, a plastics sheet and/or plastics foil, or a corresponding fabric, or the like, it is not essential that the outer layer has a profile. It may also be smooth or be a stamped, contoured, or molded sheet (e.g. pantile effect).

For internal applications, for example in the case of a partition wall, this type of composite element may also be composed of moldings modified on both sides by using latent-heat accumulators.

The microcapsules present in the moldings modified according to the invention are particles whose capsule core is mainly, and extended more than 90% by weight, composed of latent-heat-accumulator materials, and of a polymer as capsule wall. The capsule core here is solid or liquid, as determined by the temperature. The average size of the capsules (number-average by means of light scattering) is from 0.5 to 100 μm, preferably from 1 to 80 μm, particularly from 1 to 50 μm. The weight ratio of capsule core to capsule wall is generally from 50:50 to 95:5. A core/wall ratio of from 70:30 to 90:10 is preferred.

Latent-heat-accumulator materials are defined as substances which have a phase transition within the temperature range within which heat-transfer is intended. The latent-heat-accumulator materials preferably have a solid/liquid phase transition in the temperature range from −20 to 120° C. The latent-heat accumulators are generally organic, preferably lipophilic substances.

Examples which may be mentioned of suitable substances are:

aliphatic hydrocarbon compounds, such as saturated or unsaturated $C_{10}$-$C_{40}$ hydrocarbons which are branched or preferably linear, e.g. n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and also cyclic hydrocarbons, e.g. cyclohexane, cyclooctane, cyclodecane;

aromatic hydrocarbon compounds, such as benzene, naphthalene, biphenyl, o- or n-terphenyl, $C_1$-$C_{40}$-alkyl-substituted aromatic hydrocarbons, e.g. dodecylbenzene, tetradecylbenzene, hexadecylbenzene, hexylnaphthalene, or decylnaphthalene;

saturated or unsaturated $C_6$-$C_{30}$ fatty acids, such as lauric, stearic, oleic, or behenic acid, preferably eutectic mixtures composed of decanoic acid with, for example, myristic, palmitic, or lauric acid;

fatty alcohols, such as lauryl, stearyl, oleyl, myristyl, or cetyl alcohol, mixtures, such as coconut fatty alcohol, and what are known as the oxo alcohols, obtained via hydroformylation of α-olefins and further reactions;

$C_6$-$C_{30}$ fatty amines, such as decylamine, dodecylamine, tetradecylamine, or hexadecylamine;

esters, such as $C_1$-$C_{10}$-alkyl esters of fatty acids, e.g. propyl palmitate, methyl stearate, or methyl palmitate, or else preferably their eutectic mixtures, or methyl cinnamate;

natural or synthetic waxes, such as montan acid waxes, montan ester waxes, carnauba wax, polyethylene wax, oxidized waxes, polyvinyl ether wax, ethylene-vinyl acetate wax, or hard waxes from the Fischer-Tropsch process;

halogenated hydrocarbons, such as chloroparaffin, bromooctadecane, bromopentadecane, bromononadecane, bromoeicosane, bromodocosane.

Mixtures of these substances are also suitable as long as there is no resultant lowering of melting point beyond the desired range, and as long as the heat of fusion of the mixture does not become too small to be useful.

By way of example, it is advantageous to use pure n-alkanes, n-alkanes with purity greater than 80%, or alkane mixtures produced as industrial distillates and commercially available as such.

It may also be advantageous for compounds soluble in the substances forming the capsule core to be added to those substances in order to inhibit the lowering of freezing point which sometimes occurs in the case of nonpolar substances. It is advantageous, as described in U.S. Pat. No. 5,456,852, to use compounds whose melting point is higher by from 20 to 120 K than that of the actual core substance. Suitable compounds are the substances mentioned above as lipophilic substances in the form of fatty acids, fatty alcohols, fatty amines, and also aliphatic hydrocarbon compounds. The amounts used of these, based on the capsule core, are from 0.1 to 10% by weight.

The latent-heat-accumulator materials are selected in accordance with the temperature range in which the heat accumulators are desired. By way of example, for heat accumulators in construction materials in moderate conditions of temperature and humidity it is preferable to use latent-heat-accumulator materials whose solid/liquid phase transition is within the temperature range from 0 to 60° C. Individual substances or mixtures with transition temperatures of from 15 to 30° C. are therefore generally selected for interior applications.

Preferred latent-heat-accumulator materials are aliphatic hydrocarbons, and particular preference is given to the materials listed above by way of example. Particular preference is given to aliphatic hydrocarbons having 16, 17, or 18 carbon atoms, and also to mixtures of these.

The polymer used for the capsule wall may in principle comprise any of the materials known for the microcapsules for copying papers. By way of example, it is possible to encapsulate the latent-heat-accumulator materials in gelatin with other polymers according to the processes described in GB-A 870476, U.S. Pat. No. 2,800,457, U.S. Pat. No. 3,041,289.

Wall materials which are preferred because they are highly resistant to ageing are thermoset polymers. Thermoset wall materials here are those which have a high degree of crosslinking and therefore do not soften but instead decompose at high temperatures. Examples of suitable thermoset wall materials are highly crosslinked formaldehyde resins, highly crosslinked polyureas, and highly crosslinked polyurethanes, and also highly crosslinked methacrylate polymers.

Formaldehyde resins are products of the reaction of formaldehyde with triazines, such as melamine
carbamides, such as urea
phenols, such as phenol, m-cresol, and resorcinol
amino and amido compounds, such as aniline, p-toluenesulfonamide, ethyleneurea, and guanidine, or a mixture of these.

Preferred formaldehyde resins serving as capsule wall material are urea-formaldehyde resins, urea-resorcinol-formaldehyde resins, urea-melamine resins, and melamine-formaldehyde resins. Preference is also given to the $C_1$-$C_4$-alkyl, in particular methyl, ethers of these formaldehyde resins, and also to mixtures with these formaldehyde resins. Particular preference is given to melamine-formaldehyde resins and/or their methyl ethers.

In the processes known from copying papers, the resins are used in the form of prepolymers. The prepolymer remains soluble in the aqueous phase and migrates in the course of the polycondensation to the phase boundary and encloses the oil droplets. Processes for microencapsulation with formaldehyde resins are well known and are described by way of example in EP-A-562 344 and EP-A-974 394.

Capsule walls composed of polyureas and of polyurethanes are likewise known from copying papers. The capsule walls are produced via reaction of $NH_2$- or OH-bearing reactants with di- and/or polyisocyanates. Examples of suitable isocyanates are ethylene diisocyanate, tetramethylene 1,4-diisocyanate, hexamethylene 1,6-diisocyanate, and tolylene 2,4- and 2,6-diisocyanate. Mention may also be made of polyisocyanates, such as derivatives having biuret structure, polyuretonimines, and isocyanurates. Reactants which may be used are: hydrazine, guanidine, and its salts, hydroxylamine, di- and polyamines, and amino alcohols. These interfacial polyaddition processes are disclosed by way of example U.S. Pat. No. 4,021,595, EP-A 0 392 876 and EP-A 0 535 334.

Preference is given to microcapsules whose wall is a highly crosslinked methacrylate polymer. The degree of crosslinking here is achieved by using $\geq 10\%$ by weight of crosslinking agent, based on the entire polymer.

The wall-forming polymers in the preferred microcapsules are composed of from 30 to 100% by weight, preferably from 30 to 95% by weight, of one or more $C_1$-$C_{24}$-alkyl esters of acrylic and/or methacrylic acid as monomers I. The polymers may also comprise up to 80% by weight, preferably from 5 to 60% by weight, in particular from 10 to 50% by weight, of a copolymerized bi- or polyfunctional monomer as monomers II, this being insoluble or sparingly soluble in water. The polymers here may also comprise up to 40% by weight, preferably up to 30% by weight, of other copolymerized monomers III.

Suitable monomers I are $C_1$-$C_{24}$-alkyl esters of acrylic and/or methacrylic acid. Particularly preferred monomers I are methyl, ethyl, n-propyl, and n-butyl acrylate, and/or the corresponding methacrylates. Preference is given to isopropyl, isobutyl, sec-butyl, and tert-butyl acrylate, and to the corresponding methacrylates. Methacrylonitrile may also be mentioned. The methacrylates are generally preferred.

Suitable monomers II are bi- or polyfunctional monomers which are insoluble or sparingly soluble in water but have good to limited solubility in the lipophilic substance. Sparingly soluble means solubility smaller than 60 g/l at 20° C. Bi— or polyfunctional monomers are compounds which have at least 2 non-conjugated ethylenic double bonds. Monomers usually preferred are divinyl and polyvinyl monomers which bring about crosslinking of the capsule wall during polymerization.

Preferred bifunctional monomers are the diesters of diols with acrylic acid or methacrylic acid, and the diallyl and divinyl ethers of these diols.

Preferred divinyl monomers are ethanediol diacrylate, divinylbenzene, ethylene glycol dimethacrylate, 1,3-butylene glycol dimethacrylate, methallylmethacrylamide, and allyl methacrylate. Particular preference is given to propanediol diacrylate, butanediol diacrylate, pentanediol diacrylate, and hexanediol diacrylate, or the corresponding methacrylates.

Preferred polyvinyl monomers are trimethylolpropane triacrylate and trimethylolpropane trimethacrylate, pentaerythritol triallyl ether, and pentaerythritol tetraacrylate.

Monomers III which may be used are other monomers, preference being given to monomers IIIa such as styrene, α-methylstyrene, β-methylstyrene, butadiene, isoprene, vinyl acetate, vinyl propionate, and vinylpyridine.

Particular preference is given to water-soluble monomers IIIb, such as acrylonitrile, methacrylamide, acrylic acid, methacylic acid, itaconic acid, maleic acid, maleic anhydride, N-vinylpyrrolidone, 2-hydroxyethyl acrylate, 2-hydroxyethyl methacrylate, and acrylamido-2-methylpropanesulfonic acid. Alongside these, particular mention may be made of N-methylolacrylamide, N-methylolmethacrylamide, dimethylaminoethyl methacrylate, and diethylaminoethyl methacrylate.

The microcapsules suitable for use according to the invention may be prepared via what is known as in-situ polymerization.

The preferred microcapsules, on are disclosed in EP-A-457 154, DE-A-10 139 171, DE-A-102 30 581, EP-A-1 321 182, expressly incorporated herein by way of reference. By way of example, the microcapsules are reduced by using the monomers, a free-radical initiator, a protective colloid, and the lipophilic substance to be encapsulated, and from these preparing a stable oil-in-water emulsion in which they are present as disperse phase. Polymerization of the monomers is then initiated via heating and controlled preferably via further temperature increase, whereupon the resultant polymers form the capsule wall which encloses the lipophilic substance.

The polymerization is generally carried out at from 20 to 100° C., preferably at from 40 to 80° C. The dispersion temperature and polymerization temperature should naturally be above the melting point of the lipophilic substances.

Once the final temperature has been reached, it is advantageous to continue the polymerization for a period up to 2 hours, for example, in order to reduce the residual monomer content. Following the actual polymerization reaction at a conversion of from 90 to 99% by weight, it is generally advantageous to free the aqueous microcapsule dispersions essentially from odorants, such as residual monomer and other volatile organic constituents. This can be achieved in a manner known per se, physically via distillative removal (in particular by way of steam distillation) or via stripping with an inert gas. A chemical method may also be used as described in WO 9924525, advantageously via redox-initiated polymerization, as described in DE-A-4 435 423, DE-A-4419518, and DE-A-4435422.

This method can produce microcapsules with an average particle size in the range from 0.5 to 100 µm, and the particle size here may be adjusted in a manner known per se by way of the shear force, the speed of stirring, the protective colloid, and its concentration.

Preferred protective colloids are water-soluble polymers, because these lower the surface tension of water from a maximum of 73 mN/m to 45-70 mN/m and thus ensure formation of closed capsule walls and of microcapsules with preferred particle sizes of from 1 to 30 µm, preferably from 3 to 12 µm.

The microcapsules are generally produced in the presence of at least one organic protective colloid, which may be either anionic or neutral. It is also possible to use anionic and nonionic protective colloids together. It is preferable to use inorganic protective colloids, if appropriate in a mixture with organic protective colloids.

Neutral organic protective colloids are cellulose derivatives, such as hydroxyethylcellulose, carboxymethylcellulose, and methylcellulose, polyvinylpyrrolidone, vinylpyrrolidone copolymers, gelatine, gum Arabic, xanthan, sodium alginate, casein, polyethylene glycols, preferably polyvinyl alcohol and partially hydrolyzed polyvinyl acetates.

Suitable anionic protective colloids are polymethacrylic acid, the copolymers of sulfoethyl acrylate and of sulfoethyl methacrylate, of sulfopropyl acrylate and of sulfopropyl methacrylate, of N-sulfoethylmaleimide, of the 2-acrylamido-2-alkylsulfonic acids, of styrenesulfonic acid, and of vinylsulfonic acid.

Preferred anionic protective colloids are naphthalenesulfonic acid and naphthalenesulfonic acid-formaldehyde condensates, and especially polyacrylic acids and phenolsulfonic acid-formaldehyde condensates.

The amounts generally used of the anionic protective colloids are from 0.1 to 10% by weight, based on the aqueous phase of the emulsion.

Preference is given to inorganic protective colloids, known as Pickering systems, which permit stabilization by virtue of very fine solid particles and are dispersible but not soluble in water, or are insoluble and not dispersible in water, but can be wetted by the lipophilic substance.

Their mode of action and their use are described in EP-A-1 029 018 and EP-A-1 321 182, the contents of which are expressly incorporated herein by way of reference.

The Pickering system may be composed of the solid particles alone or also of auxiliaries which improve the dispersibility of the particles in water or the wettability of the particles by the lipophilic phase.

The inorganic solid particles may be metal salts, e.g. salts, oxides, and hydroxides of calcium, magnesium, iron, zinc, nickel, titanium, aluminum, silicon, barium, or manganese. Mention may be made of magnesium hydroxide, magnesium carbonate, magnesium oxide, calcium oxalate, calcium carbonate, barium carbonate, barium sulfate, titanium dioxide, aluminum oxide, aluminum hydroxide, and zinc sulfide. Mention may also be made of silicates, bentonite, hydroxyapatite, and hydrotalcites. Particular preference is given to fine-particle silicas, and to magnesium pyrophosphate and tricalcium phosphate.

The Pickering systems may either be added first to the aqueous phase or else added to the stirred oil-in-water emulsion. Some fine, solid particles are prepared via precipitation, as described in EP-A-1 029 018 and EP-A-1 321 182.

The fine-particle silicas may take the form of fine, solid particles when dispersed in water. However, it is also possible to use what are known as colloidal dispersions of silica in water. The colloidal dispersions are alkaline, aqueous mixtures of silica. In the alkaline pH range, the particles are swollen particles stable in water. For use of these dispersions as a Pickering system, it is advantageous to adjust the pH to 2-7 using an acid during the oil-in-water emulsion phase.

The amounts generally used of the inorganic protective colloids are from 0.5 to 15% by weight, based on the aqueous phase.

The amounts generally used of the neutral organic protective colloids are from 0.1 to 15% by weight, preferably from 0.5 to 10% by weight, based on the aqueous phase.

The selection of the dispersing conditions to produce the stable oil-in-water emulsion preferably follows a known method in such a way that the oil droplets have the size of the desired microcapsules.

Preference is given to inventive composite elements of which at least one outer layer is a modified molding composed of lignocellulose-containing material. The microcapsules can be incorporated into adhesive resin usually used for moldings composed of lignocellulose-containing material.

Examples of lignocellulose-containing material of the prior art are wood particles from the working of round or billet timber, waste from sawmills or from veneering processes, shavings from planing or paring processes, and other lignocellulose-containing raw materials, e.g. bagasse, flax shives, cotton stalks, jute, sisal, straw, flax, coconut fibers, banana fibers, hemp, and cork. Particular preference is given to wood fibers or wood particles. These raw materials may take the form of granules, flour, or preferably particles, fibers, and/or chips.

Preferred adhesive resins which may be mentioned are aminoplastic resins, phenolic resins, isocyanate resins, and polycarboxylic acid resins.

Aminoplastic resins which may be used are binders based on formaldehyde condensates of urea or of melamine. They are commercially available in the form of aqueous solutions or powders both in the names Kaurit® and Kauramin® (producer: BASF), and comprise urea- and/or melamine-formaldehyde precondensates. Mixed condensates and condensates which may comprise other constituents, such as phenol, or else other aldehydes, are customary. Suitable aminoplastic resins and phenol resins are ureamelamine-formaldehyde condensates, melamine-urea-formaldehyde-phenol condensates, phenol-formaldehyde condensates, phenol-resorcinol-formaldehyde condensates, urea-formaldehyde condensates, and melamine-formaldehyde condensates, and mixtures of these. Their preparation and use are well known. The starting materials are generally precondensed to a viscosity of from 200 to 500 mPas (based on a 66% strength by weight resin solutions).

Preference is given to urea- and/or melamine-formaldehyde resins, in particular to those having a molar ratio of 1 mole of urea to 1.1-1.4 mol of formaldehyde.

During the processing of aminoplastic resins, the soluble and fusible aminoplastic pre-condensates are converted into infusible and insoluble products. In this procedure, termed curing, it is known that continuous crosslinking of the pre-condensates begins to occur, and is generally accelerated by hardeners.

Hardeners which may be used are the hardeners known to the person skilled in the art for urea-, phenol-, and/or melamine-formaldehyde resins, e.g. compounds which have acidic reaction and/or which eliminate acid, e.g. ammonium salts or amine salts. The proportion of hardeners in an adhesive resin liquor, based on liquid resin content, is generally from 1 to 5% by weight.

Suitable isocyanate resins are any of the familiar resins based on methylenediphenylene isocyanates (MDI). They are generally composed of a mixture composed of monomeric material, polymeric material, and oligomeric diisocyanates, known as precondensates, these being capable of reacting with the cellulose, the lignin, and the moisture present in the wood. The resin content of moldings produced therewith is generally 3-5% by weight, based on the moldings.

Examples of suitable isocyanate resins are commercially available as Lupranat® grades (Elastogran).

Other suitable adhesive resins comprise polycarboxylic acid resins which comprise A) a polymer obtained via free-radical polymerization and composed of from 5 to 100% by weight, preferably from 5 to 50% by weight, of an ethylenically unsaturated anhydride or preferably of an ethylenically unsaturated dicarboxylic acid whose carboxylic acid groups can form an anhydride group (monomers a)), and of from 0-95% by weight, preferably from 50 to 95% by weight, of monomers b) other than the monomers a), and B) an alkanolamine having at least two hydroxy groups.

Resins of this type are described in EP-A-882 093, which is expressly incorporated herein by way of reference.

Particular preference is given to polymers which comprise, as monomers a), maleic acid and/or maleic anhydride.

Preferred monomers b) are acrylic acid, methacrylic acid, ethene, propene, butane, isobutene, cyclopentene, methyl vinyl ether, ethyl vinyl ether, acrylamide, 2-acrylamido-2-methylpropanesulfonic acid, vinyl acetate, styrene, butadiene, acrylonitrile, or a mixture of these. Particular preference is given to acrylic acid, methacrylic acid, ethene, acrylamide, styrene, and acrylonitrile, or a mixture of these.

Particular preference is given to those materials in which the monomer b) comprises at least one $C_3$-$C_6$ monocarboxylic acid, preferably acrylic acid, as comonomer b).

The polymers may be prepared by conventional polymerization processes, e.g. via bulk, emulsion, suspension, dispersion, precipitation, or solution polymerization. Conventional apparatus is used for all the polymerization methods, e.g. stirred tanks, stirred tank cascades, autoclaves, tubular reactors, or kneaders. These operations are carried out with exclusion of oxygen, as is familiar to the person skilled in the art. The preferred method used is solution or emulsion polymerization. The polymerization is carried out in water, if appropriate with proportions of up to 60% by weight of alcohols or glycols as solvent or diluent.

If polymerization is carried out in aqueous solution or in a diluted system, the ethylenically unsaturated carboxylic acids may be partially or completely neutralized by bases prior to or during the polymerization. Examples of bases which may be used are alkali metal compounds, alkaline earth metal compounds, ammonia, primary, secondary, or tertiary amines, such as diethanolamine or triethanolamine, or else polybasic amines.

It is particularly preferable that the ethylenically unsaturated carboxylic acids are not neutralized either prior to or during the polymerization. It is also preferable that no neutralizing agent other than alkanolamine B) is added after the polymerization.

A wide variety of continuous or batch techniques can be used to carry out the polymerization. The usual method forms an initial charge of a portion of the monomers, if appropriate in a suitable diluent or solvent and if appropriate in the presence of an emulsifier, a protective colloid, or other auxiliaries, inertizes this initial charge, and increases the temperature until the desired polymerization temperature has been reached. Within a defined period, the free-radical initiator, other monomers and other auxiliaries, such as regulators or crosslinking agents are metered in, if appropriate in each case in a diluent.

The polymers A) preferably take the form of an aqueous dispersion or solution with solids contents which are preferably from 10 to 80% by weight, in particular from 40 to 65% by weight.

As component B), alkanolamines having at least two OH groups are used, examples being diethanolamine, triethanolamine, diisopropanolamine, triisopropanolamine, methyldiethanolamine, butyldiethanolamine, and methyldiisopropanolamine. Triethanolamine is preferred.

To prepare the polycarboxylic acid resins, the polymer A) and the alkanolamine B) are preferably used in a ratio to one another such that the molar ratio of carboxy groups of component A) and the hydroxy groups of component B) is from 20:1 to 1:1, preferably from 8:1 to 5:1, and particularly preferably from 5:1 to 1.7:1 (the anhydride groups here being regarded as 2 carboxy groups for the calculation).

An example of the preparation of the polycarboxylic acid resins is simple addition of the alkanolamine to the aqueous dispersion or solution of the polymers A).

The microcapsules may be added in various ways, and at various points in the manufacturing process, to the mixture composed of wood fibers or of wood particles and binder and serving as basis for the moldings.

The form in which the microcapsules are incorporated into the binder composition may be that of a dispersion, or preferably that of a powder. The amount of microcapsules incorporated here, based on the molding, is from 2 to 30% by weight, preferably from 5 to 15% by weight. However, it is also possible to dry the microcapsules in a first step together with the lignocellulose-containing materials and then to cure them thermally with the adhesive resin.

Preferred moldings comprise lignocellulose-containing materials and, based on the weight of the molding, from 5 to 20% by weight of adhesive resin, calculated as solid, and from 2 to 30% by weight of microcapsules.

Suitable binder compositions comprise from 40 to 95% by weight, preferably from 40 to 65% by weight, in particular from 50 to 60% by weight, of adhesive resin, calculated as solid, from 5 to 40% by weight, preferably from 10 to 35% by weight, in particular from 20 to 30% by weight, of microcapsules, and, if appropriate, water, based on 100% by weight of binder composition.

Together with the adhesive resin for moldings composed of lignocellulose-containing materials, use may moreover be made of conventional auxiliaries and additives, such as the abovementioned hardeners, buffers, insecticides, fungicides, fillers, hydrophobicizing agents, such as silicone oils, paraffins, waxes, fatty acid soaps, water retention agents, wetting agents, and flame retardants, such as borates and aluminum hydroxide.

In particular, the modified moldings are boards. Depending on the size of the lignocellulose-containing particles used, a distinction is drawn between OSB (oriented structural board), particle board, and medium-density (MDF) and high-density (HDF) fiberboard. The binder composition is preferably used for wood-particle materials, particularly board.

The lignocellulose-containing materials may be coated directly with the microcapsules or with the binder composition. In one variant of the process, the lignocellulose-containing materials are mixed with the binder composition and this mixture is cured thermally, the binder composition here comprising from 40 to 95% by weight of adhesive resin and from 5 to 40% by weight of microcapsules with a polymer as capsule wall and with a capsule core composed mainly of latent-heat-accumulator materials, and from 0 to 20% by weight of water.

In one variant of the process, from 9 to 30% by weight, preferably from 12 to 20% by weight, of the aqueous binder composition, based on the total amount of lignocellulose-containing material and binder composition, are added to the lignocellulose-containing materials.

The viscosity of the aqueous binder composition is preferably adjusted (particularly in production of moldings composed of wood fibers or of wood particles) to from 10 to 10 000 mPa·s, particularly preferably to from 50 to 1500 mPa·s, and very particularly preferably to from 100 to 1000 mPa·s (DIN 53019, rotary viscometer at 41 sec$^{-1}$).

The mixture composed of lignocellulose-containing materials and of the binder composition may, for example, be predried at temperatures of from 10 to 150° C. and then pressed to give the moldings, e.g. at temperatures of from 50 to 300° C., preferably from 100 to 250° C., and particularly preferably from 140 to 225° C. and at pressures which are generally from 2 to 200 bar, preferably from 5 to 100 bar, particularly preferably from 20 to 50 bar. Surprisingly, despite the high molding temperatures combined with the pressures no breakdown of the microcapsules occurs, although the molding temperatures are mostly above the softening points of the capsule wall materials.

The binder compositions are particularly suitable for production of timber-based materials such as particle board and wood fiber board (cf. Ullmanns Encyclopädie der technischen Chemie [Ullmann's Encyclopedia of Industrial Chemistry], 4th Edition 1976, Volume 12, pp. 709-727), which can be produced via adhesive bonding of comminuted wood, such as wood particles and wood fibers.

The production of particle board is well known and is described by way of example in H. J. Deppe, K Ernst Taschenbuch der Spanplattentechnik [Handbook of Particle Board Technology], 2nd Edition, Verlag Leinfelden 1982.

Continuous mixers are used in particle board production to apply adhesive to the previously dried particles. Adhesive is mostly applied to different particle fractions by different processes in separate mixers, then the fractions are charged separately (multilayer board) or together. The microcapsules may be added in aqueous solution to the particles upstream of the drier in a continuous mixer, or during adhesive application, together with or separately from the adhesive. A combination of the two processes is also possible.

It is preferable to use particles whose average particle thickness is from 0.1 to 2 mm, in particular from 0.2 to 0.5 mm, and which comprise less than 6% by weight of water. The binder composition is applied with maximum uniformity to the wood particles, for example by spraying finely dispersed binder composition onto the particles.

The wood adhesive-coated particles are then spread to give a layer with maximum uniformity of surface, and the thickness of this layer depends on the desired thickness of the finished particle board. The scattered layer is, if appropriate, precompacted while cold and pressed at a temperature of, for example, from 100 to 250° C., preferably from 140 to 225° C., by application of pressures which are usually from 10 to 750 bar, to give a dimensionally stable board. The press times needed may vary within a wide range and are generally from 15 seconds to 30 minutes.

Wood fibers of the appropriate quality needed for production of medium-density wood fiber board (MDF) from the binders can be produced from bark-free wood chips via grinding in specific mills or in what are known as refiners at temperatures of about 180° C.

For production of MDF board and HDF board, adhesive is applied to the fibers in the blowline downstream of the refiner. For adhesive application, the wood fibers are generally fluidized by a stream of air, and the binder composition is injected into the resultant stream of fibers (blowline process). The fibers with applied adhesive then pass through a drier in which they are dried at moisture levels of from 7 to 13% by weight. Occasionally, the fibers are first dried and then the adhesive is applied in specific continuous mixers. A combination of blowline and adhesive application in a mixer is also possible. The addition of the microcapsules to the fibers may take place in aqueous solution in the blowline together with or separately from the adhesive. The ratio of wood fibers to binder composition, based on dry content or solid content, is usually from 40:1 to 3:1, preferably from 20:1 to 4:1. The fibers with applied adhesive are dried in the fiber stream at temperatures of, for example, from 130 to 180° C., spread to give a fiber web, if appropriate precompacted while cold, and pressed at pressures of from 20 to 40 bar to give boards or moldings.

In OSB production, the wood particles (strands) are dried to moisture levels of from 1 to 4% and separated into middle- and outer-layer material, and adhesive is applied to these separately in continuous mixers. The addition of the microcapsules to the wood particles may take place in aqueous solution upstream of the drier in a continuous mixer, or during adhesive application, together with or separately from the adhesive. A combination of the two processes is also possible.

To manufacture the boards, mats are then formed from the unbonded adhesive-coated wood particles, which are, if appropriate, precompacted while cold, and are pressed in heated presses at temperatures of from 170 to 240° C. to give boards.

Other natural fiber materials, such as sisal, jute, hemp, straw, flax, coconut fibers, banana fibers and other natural fibers, may also be processed with the binders to give boards or moldings. The natural fiber materials may also be used in mixtures with synthetic fibers, e.g. polypropylene, polyethylene, polyester, polyamides or polyacrylonitrile. These synthetic fibers may also function here as co-binder alongside the binder composition. The proportion of the synthetic fibers here is preferably less than 50% by weight, in particular less than 30% by weight, and very particularly preferably less than 10% by weight, based on all of the particles, chips, or fibers. The fibers may be processed by the method practiced for wood fiber boards. However, pre-formed natural fiber mats may also be impregnated with the binder compositions, if appropriate with addition of the wetting aid. The impregnated mats, moist with binder or predried, are then pressed, for example at temperatures of from 100 to 250° C. and at pressures of from 10 to 100 bar to give boards or moldings.

Preference is also given to composite elements in which at least one outer layer is a modified molding based on gypsum plaster. The moldings are preferably gypsum plasterboard as described in WO 03016650. For this, the microcapsules in the form of powders or in the form of dispersion are processed with the gypsum plaster. The amount of microcapsules incorporated here is preferably from 5 to 40% by weight, in particular from 20 to 35% by weight, based on the total weight of the gypsum plasterboard (dry weight).

Gypsum plasterboard is generally composed of a gypsum plaster core with paperboard sheets applied on both sides. It is usually produced by introducing aqueous gypsum plaster slurry batchwise or continuously between two sheets of cellulose-based paperboard, thus forming boards. The gypsum slurry is prepared, as is well known, via continuous addition and continuous mixing of calcium sulfate β-hemihydrate in water with additives. The microcapsules may be metered together with the calcium sulfate, or else they take the form of a previously prepared aqueous dispersion. The resultant gypsum plaster slurry is applied to the paperboard sheets, for example sprayed, and covered with paperboard.

During initial hardening, the boards are molded in a press to give strips with, for example, width from 1.2 to 1.25 m and thickness of 9.25, 12.5, 15.0, 18.0, or 25 mm. These strips harden within a few minutes and are cut into boards. At this stage, the boards generally still comprise unbound water as one third of their weight. In order to remove the residual water, the boards are subjected to heat treatment at temperatures of about 250° C. The density of the resultant gypsum plasterboard is from 750 to 950 kg/m$^3$.

The weight of the paperboard usually used for gypsum plasterboard is about 300 g/m$^2$. This type of paperboard is mostly produced in two or more layers, the final layer being the outer layer of the paperboard and having a weight of from 10 to 100 g/m$^2$, preferably from 30 to 70 g/m$^2$.

Alternative fiber-like structures may also be used instead of cellulose-based paperboard as covering for the two sides of the inventive gypsum plasterboard. Alternative materials are polymer fibers composed of, for example, polypropylene, polyester, polyamide, polyacrylates, polyacrylonitrile, or the like, Glass fibers are also suitable. The form in which the alternative materials are used may be that of fabrics or of what are known as "nonwovens", i.e. web-like structures.

Gypsum plasterboard of this type is disclosed by way of example in U.S. Pat. No. 4,810,569, U.S. Pat. No. 4,195,110, and U.S. Pat. No. 4,394,411.

Increased adhesion to substrates such as paperboard can be achieved via addition of natural and/or synthetic polymers. Suitable water-soluble polymers are: starch and starch ethers, relatively high-molecular-weight methylcellulose and other cellulose derivatives, guar gum derivatives, thermoplastic dispersion powders and liquid dispersions based on vinyl acetate, ethylene-vinyl acetate, vinyl propionate, styrenebutadiene, styrene-acrylate, and straight acrylate. The amount added of the polymers is from 0.1 to 5% by weight, based on the total dry weight of gypsum plaster and latent-heat accumulator.

Other additives which may also be advantageously added to gypsum plaster compositions are water retention agents and/or thickeners. Examples are polyvinyl alcohol, cellulose derivatives, such as hydroxyethylcellulose, hydroxypropylcellulose, carboxymethylcellulose, polyacrylic acid and copolymers with acrylic acid, such as polyethylene-co-acrylic acid, polymaleic acid-co-acrylic acid, polyisobutylene-co-acrylic acid, and acrylic-acid-rich polymer dispersions with styrene or with acrylic esters or vinyl acetate, these being used as thickeners for, by way of example, paper finishing. The amounts usually used of the water retention agents and/or thickeners are from 0.5 to 2% by weight, based on the total dry weight of gypsum plaster and latent-heat accumulator.

The rigid foams used for the composite elements composed of rigid polyurethane foam have been known for a long time and are widely described in the literature. They are generally produced via reaction of organic polyisocyanates with compounds having at least two hydrogen atoms reactive toward isocyanate groups, mostly polyols.

Organic polyisocyanates c) which may preferably be used are aromatic polyfunctional isocyanates. Specific examples which may be mentioned are tolylene 2,4- and 2,6-diisocyanate (TDI) and the corresponding isomer mixtures, diphenylmethane 4,4'-, 2,4'-, and 2,2'-diisocyanate (MDI) and the corresponding isomer mixtures, mixtures composed of diphenylmethane 4,4'- and 2,4'-diisocyanates, polyphenyl polymethylene polyisocyanates, mixtures composed of diphenylmethane 4,4'-, 2,4'-, and 2,2'-diisocyanates and of polyphenyl polymethylene polyisocyanates (crude MDI), and mixtures composed of crude MDI and of tolylene diisocyanates. The organic di- and polyisocyanates may be used individually or in the form of mixtures.

Use is also often made of what are known as modified polyfunctional isocyanates, i.e. products obtained via chemical reaction of organic di- and/or polyisocyanates. Examples which may be mentioned are di- and/or polyisocyanates comprising isocyanurate groups and/or comprising urethane groups. The modified polyisocyanates may, if appropriate, be mixed with one another or with unmodified organic polyisocyanates, such as diphenylmethane 2,4'- or 4,4'-diisocyanates, crude MDI, or tolylene 2,4- and/or 2,6-diisocyanate.

Alongside these, use may also be made of reaction products of polyfunctional isocyanates with polyfunctional polyols, or else of their mixtures with other di- and polyisocyanates.

An organic polyisocyanate which has proven particularly successful is crude MDI with an NCO content of from 29 to 33% by weight and a viscosity in the range from 150 to 1000 mPa·s at 25° C.

Particular compounds d) used having at least two hydrogen atoms reactive toward isocyanate are polyether alcohols and/or polyester alcohols with OH numbers in the range from 100 to 1200 mg KOH/g.

The polyester alcohols are mostly prepared via condensation of polyhydric alcohols, preferably diols, having from 2 to 12 carbon atoms, preferably from 2 to 6 carbon atoms, with polybasic carboxylic acids having from 2 to 12 carbon atoms, e.g. succinic acid, glutaric acid, adipic acid, suberic acid, azelaic acid, sebacic acid, decanedicarboxylic acid, maleic acid, fumaric acid, or preferably phthalic acid, isophthalic acid, terephthalic acid, or the isomeric naphthalenedicarboxylic acids.

The polyether alcohols mostly have a functionality of from 2 to 8, in particular from 3 to 8. Use is particularly made of polyether polyols prepared by known processes, for example via anionic polymerization of alkylene oxides in the presence of catalysts, preferably alkali metal hydroxides.

Alkylene oxides used are mostly ethylene oxide and/or propylene oxide, preferably pure propylene 1,2-oxide.

Starter molecules which may be used are in particular compounds having at least 3, preferably from 4 to 8, hydroxy groups or having at least two primary amino groups in the molecule.

Starter molecules which may preferably be used and have at least 3, preferably from 4 to 8, hydroxy groups in the molecule are trimethylolpropane, glycerol, pentaerythritol, sugar compounds, such as glucose, sorbitol, mannitol, and sucrose, polyhydric phenols, resols, such as oligomeric condensates of phenol and formaldehyde, and Mannich condensates composed of phenols, of formaldehyde, and of dialkanolamines, and also melamine.

Starter molecules which may preferably be used and have at least two primary amino groups in the molecule are aromatic di- and/or polyamines, such as phenylenediamines, 2,3-, 2,4-, 3,4-, and 2,6-tolylenediamine, and 4,4'-, 2,4'-, and 2,2'-diaminodiphenylmethane, or else aliphatic di- and polyamines, such as ethylenediamine.

The polyether polyols have a functionality which is preferably from 3 to 8 and hydroxy numbers which are preferably from 100 to 1200 mg KOH/g, and in particular from 240 to 570 mg KOH/g.

Among the compounds d) having at least two hydrogen atoms reactive toward isocyanate are also the crosslinking agents and chain extenders which are used concomitantly, if appropriate. The addition of difunctional chain extenders, trifunctional or higher-functionality crosslinking agents or, if appropriate, mixtures of these can prove advantageous for modifying mechanical properties. Preferred chain extenders and/or crosslinking agents used are alkanolamines and in particular diols and/or triols with molecular weights below 400, preferably from 60 to 300.

The amount advantageously used of chain extenders, crosslinking agents, or mixtures of these is from 1 to 20% by weight, preferably from 2 to 5% by weight, based on the polyol component b).

Further information concerning the polyester alcohols and polyether alcohols used, and also their preparation, is found by way of example in Kunststoffhandbuch [Plastics handbook], Volume 7 "Polyurethane" ["Polyurethanes"], edited by Günter Oertel, Carl-Hanser-Verlag Munich, 3rd Edition, 1993.

Flame retardants conventional for polyurethane chemistry can also be used, as can the substances described in DE-A-101 24 333.

The rigid polyurethane foams are usually produced in the presence of blowing agents, catalysts, and cell stabilizers, and also, if necessary, of other auxiliaries and/or additives, these being well known in polyurethane chemist and described in DE-A-101 24 333, expressly incorporated herein by way of reference. Auxiliaries and/or additives which may be used for this purpose are substances known per se, such as surfactants, foam stabilizers, cell regulators, fillers, pigments, dyes, flame retardants, hydrolysis stabilizers, antistatic agents, fungistatic agents and bacteriostatic agents. Further information concerning the conduct of the inventive process, in terms of starting materials used, blowing agents, catalysts, and also auxiliaries and/or additives are found by way or example in Kunststoffhandbuch, Volume 7, "Polyurethane" ["Polyurethanes"], Carl-Hanser-Verlag Munich, 1st Edition, 1966, 2nd Edition, 1983, and 3rd Edition, 1993.

The rigid polyurethane foam can be used to produce a sandwich element for outdoor use, either continuously or batchwise, and a structural feature of this element is that it has a conventional outer layer on one side and, on the opposite side, an outer layer modified according to the invention by using latent-heat-accumulator material.

A sandwich element for indoor use may also be produced either continuously or batchwise, a structural feature of the element being that it has, on both sides, outer layers modified according to the invention by using latent-heat-accumulator materials.

The rigid polyurethane foams may be produced batchwise or continuously with the aid of known mixing apparatus. The inventive composite elements are preferably produced from rigid foams on continuously operating twin-belt systems. Here, a high-pressure machine is used to feed the polyol component and isocyanate component, which are mixed in a mixing head. Catalysts and/or blowing agents may be metered in advance into the polyol mixture by separate pumps. The starting components are mostly mixed at a temperature of from 15 to 35° C., preferably from 20 to 30° C. The reaction mixture is continuously applied to the lower outer layer. The lower outer layer with the reaction mixture and the upper outer layer run into the twin-belt system, where the reaction mixture foams and cures. Once the continuous band has left the twin-belt system, it is cut to the desired dimensions. This method can also produce the inventive composite elements, known as sandwich elements, with the same or different outer layers. The thickness of the inventive composite elements is usually from 20 to 300 mm, and the usual density range of the rigid polyurethane foam for production of these moldings is from 10 to 60 kg/m$^3$ preferably from 30 to 50 kg/m$^3$ (Kunststoffhandbuch [Plastics handbook], 3rd Edition, page 150).

High- or low-pressure feed machines can also be used to cast the reaction mixture into closed supportive molds (e.g. press molds). This technology is used for, by way of example, batchwise manufacture of inventive composite elements.

The composite elements can eliminate unsatisfactory internal atmospheric conditions. The buildings produced with them exhibit not only good thermal insulation but also a marked improvement in temperature profile and therefore in energy consumption.

The examples below are intended to describe the invention in further detail:

EXAMPLE 1

A sandwich element was produced and is composed of a profiled steel outer layer of thickness 0.6 mm (outward-facing side), the Elastopor® rigid polyurethane foam system (Elastogran, mixing ratio of polyol component A to isocyanate component B=100:106), and a gypsum plasterboard modified with latent-heat accumulator (thickness 15 mm, glass-fiber-reinforced, comprising 30% by weight of microencapsulated latent-heat-accumulator material=3 kg of PCM/m², inward-facing side). The dimensions of this molding were 2000× 1150×100 mm. The envelope core density of the foam was 36.4 kg/m³, with thermal conductivity of about 23 mW/mK. The heat capacity of the gypsum-plaster-containing inward-facing layer in the region of the melting point was 330 kJ/m². The thermal conductivity of the inventive sandwich element was therefore the same as that of a conventional sandwich element (metal/PU/metal), whereas the heat capacity of the inventive sandwich element, 330 kJ/m², is markedly above that of a conventional sandwich element, 0.67 kJ/m². (The specific heat capacity of a steel layer is 0.48 kJ/kgK. The temperature range considered is 3 K.)

EXAMPLE 2

A sandwich element composed of a profiled steel outer layer the rigid polyurethane foam system described above, and a conventional particle board (thickness 19 mm) was also produced as in example 1. The dimensions of this molding were 2700×1170×120 mm. This demonstrated that this type of combination of materials is feasible in principle Inventive sandwich elements can be produced similarly with PCM-containing particle board.

These experiments demonstrated that it is possible to produce sandwich elements which directly combine high heat-accumulator capability with high insulation performance.

The invention claimed is:

1. A composite element, comprising:
    a rigid polyurethane foam inner layer and two outer layers,
    wherein at least one outer layer is a self-supporting particle board comprising a mixture of microcapsules, an adhesive resin, and at least one of lignocellulose particles and lignocellulose fibers, wherein the lignocellulose particles or the lignocellulose fibers are present in an amount of 50 to 93% by weight based on the weight of the particle board,
    wherein said microcapsules comprise a polymer as capsule wall and a capsule core comprising mainly a latent-heat-accumulator material, said latent heat-accumulator material being a lipophilic substance with a solid/liquid phase transition in the temperature range from −20 to 120° C., and
    wherein the microcapsules are uniformly dispersed in the particle board in an amount of from 2 to 30% by weight based on the weight of the particle board.

2. The composite element according to claim 1, wherein said latent-heat-accumulator material is an aliphatic hydrocarbon compound.

3. The composite element according to claim 1, wherein said capsule wall is a highly crosslinked methacrylate polymer.

4. The composite element according to claim 1, wherein said capsule wall comprises
    from 30 to 100% by weight of one or more of at least one of a $C_1$-$C_{24}$-alkyl ester of acrylic and a methacrylic acid,
    from 0 to 80% by weight of a bi- or polyfunctional monomer, which is insoluble or sparingly soluble in water, and
    from 0 to 40% by weight of other monomers, based in each case on the total weight of the monomers.

5. The composite element according to claim 4, wherein said microcapsules are obtained by heating an oil-in-water emulsion comprising the monomers, a free-radical initiator, and the latent-heat-accumulator material as a disperse phase.

6. The composite element according to claim 1, wherein the adhesive resin is selected from the group consisting of aminoplastic resin, phenolic resin, isocyanate resin, and polycarboxylic acid resin.

7. The composite element according to claim 6, wherein said adhesive resin is at least one of a urea- and a melamine-formaldehyde resin.

8. The composite element according to claim 1, wherein said self-supporting particle board comprises from 5 to 20% by weight of adhesive resin, calculated as solid, based on the weight of the particle board.

9. The composite element of claim 1, wherein the self-supporting particle board has a thickness of from 9.25 to 25 mm.

10. A process for making the composite element of claim 1, comprising:
    applying a mixture comprising a polyol component and an isocyanate component to a lower layer to form a coated lower layer coated with the mixture,
    joining the coated lower layer with an upper layer to form a sandwich structure in which the mixture has reacted to form a rigid polyurethane inner layer between the lower layer and the upper layer;
    wherein the upper layer or the lower layer is a self-supporting outer layer of the particle board of the composite element; and
    wherein the lower layer and the upper layer are continuously transported on a twin belt system during the applying and the joining.

* * * * *